United States Patent [19]

Grahn

[11] 3,751,805
[45] Aug. 14, 1973

[54] HEDGE TRIMMER
[75] Inventor: Robert D. Grahn, Hinsdale, Ill.
[73] Assignee: Sunbeam Corporation, Chicago, Ill.
[22] Filed: Apr. 29, 1971
[21] Appl. No.: 138,765

Related U.S. Application Data
[62] Division of Ser. No. 569,490, Aug. 1, 1966, Pat. No. 3,579,827.

[52] U.S. Cl. ................................................. 30/220
[51] Int. Cl............................................. B26b 19/02
[58] Field of Search...................... 30/210, 221, 222, 30/223, 220; 310/50

[56] References Cited
UNITED STATES PATENTS
2,607,113  8/1952  James .................................. 30/220
3,049,802  8/1962  Burk .................................. 30/221 X
3,431,647  3/1969  Scott ..................................... 30/210

FOREIGN PATENTS OR APPLICATIONS
1,066,601  4/1967  Great Britain ........................ 30/220

Primary Examiner—James L. Jones, Jr.
Assistant Examiner—J. C. Peters
Attorney—George R. Clark

[57] ABSTRACT

An electric motor driven hedge trimmer having an elongated split housing and a forwardly extending reciprocating cutter and comb assembly. The split housing forms a gear chamber above a portion of the cutter and comb assembly and supports a stationary post at one end. The post rotatably supports one of the gears through which the cutter assembly is driven. The comb which is disposed below the reciprocating cutter supports the other end of the stationary post and the cutter is provided with a slot to provide clearance for the post. A saw blade is attached to the end of the cutter remote from the housing. The rear portion of the housing provides a handle and a transversely disposed loop-shaped handle is also provided. A level gauge is secured on top of the housing.

7 Claims, 10 Drawing Figures

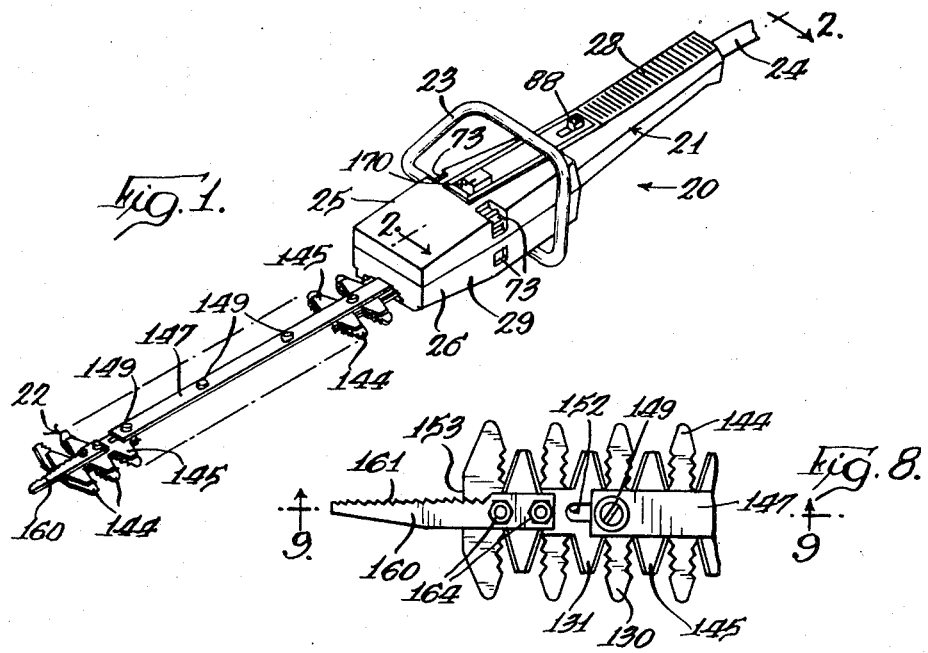
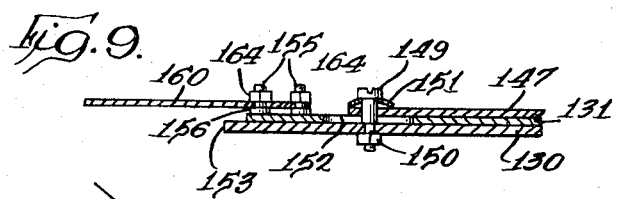
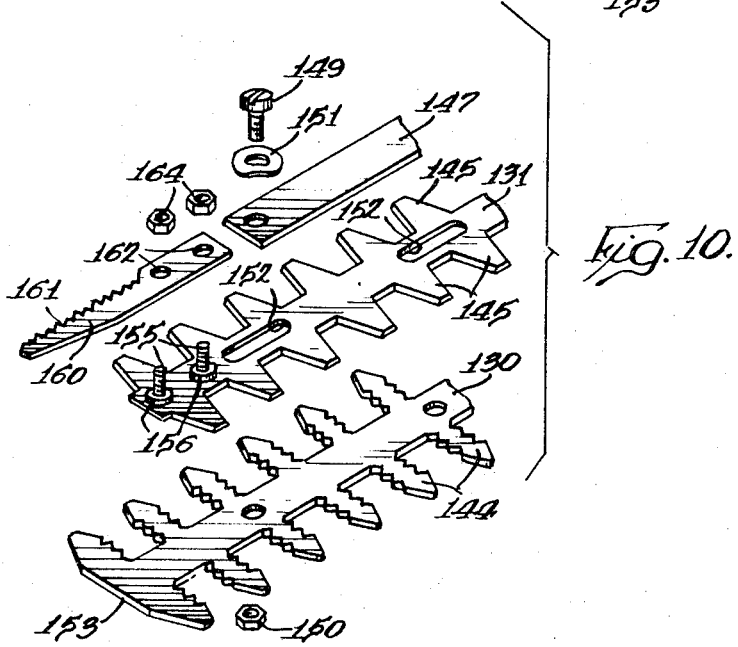

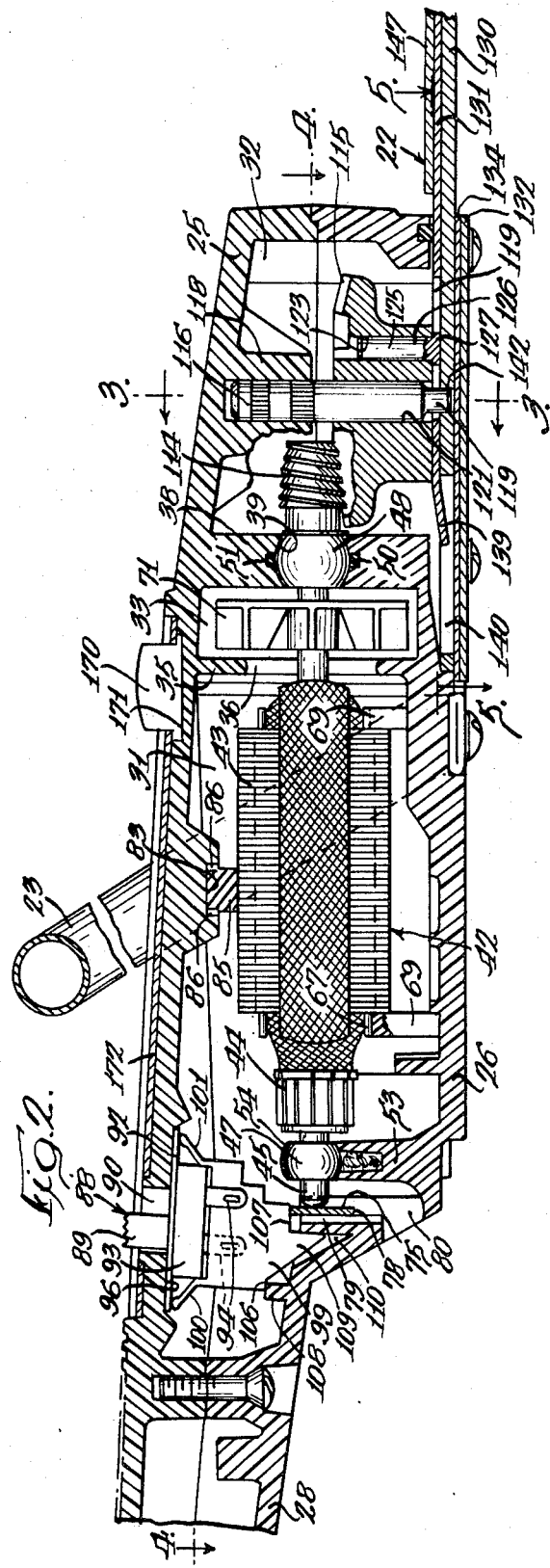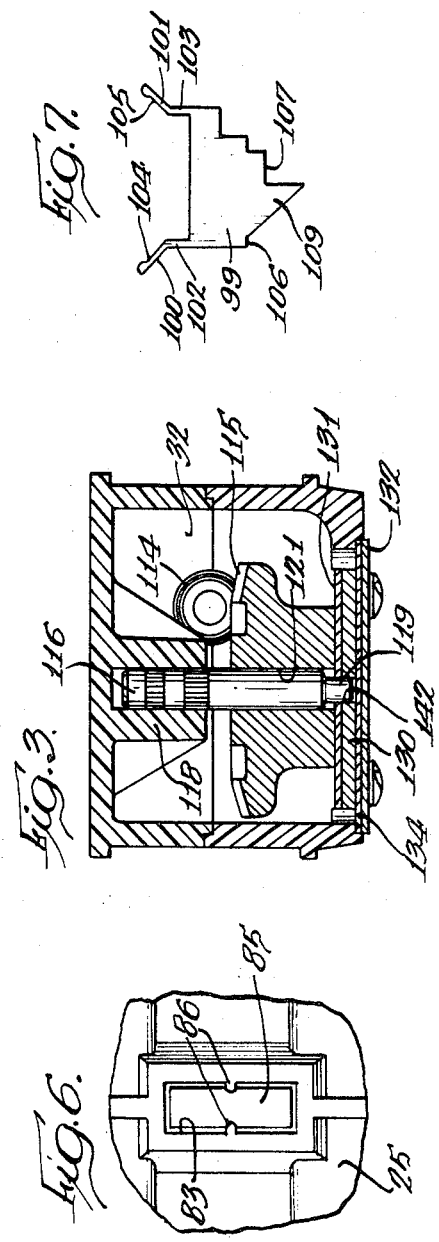

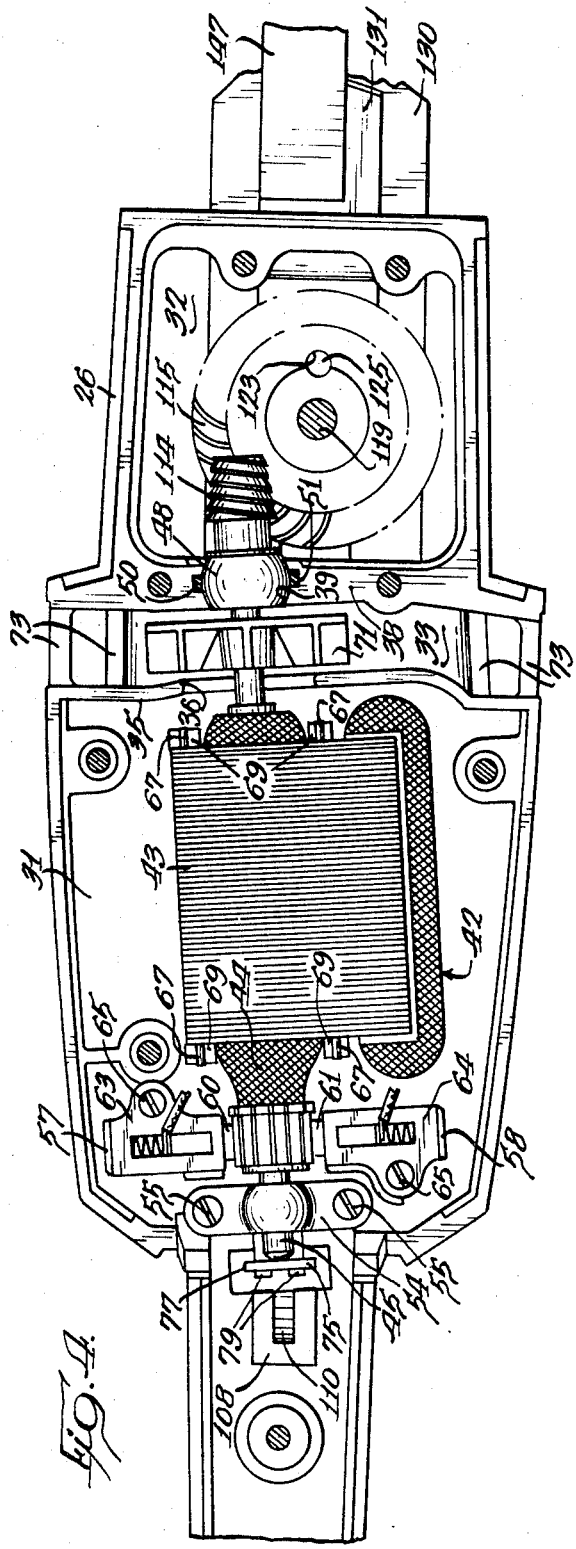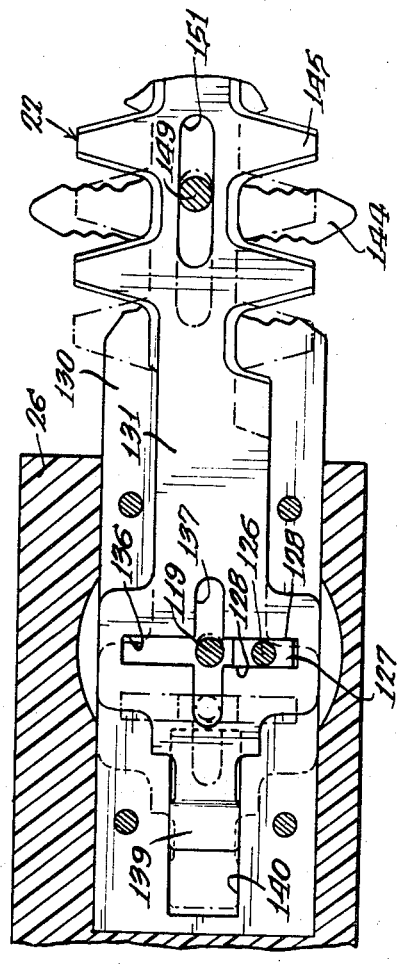

HEDGE TRIMMER

This is a division of application Ser. No. 569,490, filed Aug. 1, 1966 now U.S. Pat. No. 3,579,827 issued May 25, 1971.

This invention relates to hedge trimmers and more particularly to an improved portable electric hedge trimmer.

For many years, electrically operated hedge trimmers have been sold in this country. The hedge trimmer disclosed in U.S. Pat. No. 3,083,457, which is assigned to the same assignee as the present invention, has been manufactured and successfully marketed. This type of hedge trimmer allows the user to artfully trim a considerable length of hedge in a minimum amount of time. However, electrically operated hedge trimmers are relatively expensive and, consequently, the sales volume of this appliance is somewhat limited due to its sales price. There have been many attempts made in the prior art to devise an electric hedge trimmer which is inexpensive to manufacture and yet accomplishes the trimming operation in an expeditious manner.

In prior art electric hedge trimmers, the use of a split motor housing has been mployed to provide an inexpensive design and to facilitate repairs. However, none of the prior art hedge trimmer split housings were designed in a manner which substantially reduces the manufacturing cost.

One of the significant costs in an electrically operated hedge trimmer is the power transfer means which converts the rotary motion of an electric motor to a reciprocating motion driving the longitudinally reciprocating cutter. The power transfer means must also provide for a substantial reduction in speed since the electric motor rotates at a high r.p.m. and the reciprocating cutter must operate at a much slower speed. Normally, two pairs of gears are required for the speed reduction and a number of accurately manufactured parts are necessary to convert the rotary motion into reciprocating motion.

Inasmuch as relatively heavy branches are sheared by the reciprocating cutter, it is necessary that the hedge trimmer motor be rather husky. Furthermore, if a single speed reduction means is employed having gear teeth disposed at an angle to the armature shaft, it is necessary to provide a relatively strong thrust support for the motor armature. However, it is desirable to use a plastic motor housing in order to hold the manufacturing cost to a minimum. Thus, the thrust of the armature shaft impresses rather severe stresses on the motor housing which must be accommodated by some inexpensive means.

Accordingly, it is an object of the present invention to provide an improved electrically operated hedge trimmer which is easily manufactured and inexpensive.

A further object of the present invention is to provide a hedge trimmer having a split housing which provides rigid support for the power transfer means.

Another object of the invention is to provide an electric hedge trimmer having an improved means to hold the motor in position.

A still further object of the present invention is to provide a hedge trimmer employing a split housing having an improved means of holding internal parts in their proper operating positions.

Yet a further object of the present invention is to provide an electric hedge trimmer having a split plastic housing wherein the armature shaft is rigidly held in position by means and that said means is provided with an adequate supply of cooling air.

Another object of the invention is to provide an electric hedge trimmer having an elongated housing which is conveniently manipulated by the user and has an aligned cutter assembly for both shearing and cutting.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of an electric hedge trimmer embodying the present invention;

FIG. 2 is an enlarged fragmentary sectioned view taken substantially along line 2—2 of FIG. 1;

FIG. 3 is a sectioned view taken substantially along line 3—3 of FIG. 2;

FIG. 4 is a fragmentary sectioned view taken substantially along line 4—4 of FIG. 2;

FIG. 5 is a sectioned view taken substantially along line 5—5 of FIG. 2 to illustrate the portion of the cutter assembly which is attached to the housing;

FIG. 6 is a fragmentary bottom plan view of motor mounting block and the portion of the upper housing section which retains it;

FIG. 7 is a side elevational view of the switch and thrust pad retaining member;

FIG. 8 is a top plan view of the cutter assembly which is remote from the housing, FIG. 9 is a side elevational view of the cutter assembly taken along line 9—9 of FIG. 8; and FIG. 10 is an exploded assembly view of the outer end of the cutter assembly.

Briefly, the present invention relates to an electric hedge trimmer including a split housing having an upper and lower section, and an electric motor and an elongated cutter assembly secured to the lower housing section. Preferably, the housing forms a gear chamber above a portion of the cutter assembly and the electric motor includes an armature shaft which extends into the housing gear chamber. A gear is mounted on the portion of the shaft disposed in the chamber and a second gear is rotatably supported on a post which depends downwardly from the upper housing section. The second gear is in driving engagement with the first gear and motion transfer means is provided between the second gear and the cutter assembly so that the rotation of the armature shaft causes the cutter assembly to reciprocate. Moreover, the cutter assembly provides support for the post at its lower end.

In one aspect of the invention, the connecting means between the cutter assembly and the second gear includes an eccentric having a tubular portion which is received by said second gear for rotation about an axis spaced from the axis of rotation for the gear and a block portion which is in engagement with a transversely extending slot in a reciprocable cutter. Preferably, a longitudinally extending slot intersects the transverse slot in order to provide clearance for the post which is in engagement with a stationary comb.

Furthermore, a switch holder is provided in the split housing for biasing a switch assembly toward its proper position and, in addition, holding a thrust pad for the armature shaft in proper location.

Referring now to the drawings, there is illustrated an electric hedge trimmer generally designated by the reference numeral 20. As may be seen in FIG. 1, the hedge trimmer 20 includes a housing 21 supporting a cutter assembly 22 and a looped handle 23. An electric power cord 24 extends from the housing at the opposite end from the cutter assembly 22. Preferably, the housing 21 is molded from a phenolic plastic and has a split construction with an upper section 25 and a lower section 26. Moreover, the housing 21 is elongated with a rear portion 28 forming a handle and a forward portion 29 having a somewhat larger cross-section.

Preferably, the power cord 24 enters the housing 21 through the handle portion 28 and is fastened thereto by a suitable strain relief means. The forward portion of the housing 29 includes a motor chamber 31 and a gear chamber 32 and disposed therebetween is a fan chamber 33. The motor chamber 31 is formed by the side walls of the housing 21 and a transverse wall 35 which is formed by both the upper and lower sections 25 and 26. The wall 35 has a central opening 36 forming a passageway between the motor chamber 31 and the fan chamber 33. The gear chamber 32 is formed by the side walls of the housing 21 and also by transverse wall 38 having a spherical opening 39. The fan chamber 33 is formed by the side walls of the housing 21 and the transverse walls 35 and 38. Disposed within the motor chamber 31 is an electric motor 42 having a field assembly or stator 43 and an armature 44 mounted on shaft 45. Supporting the armature shaft 45 are spherical sleeve bearings 47 and 48. The bearing 48 is retained in the spherical opening 39 in wall 38. The parting line between the upper and lower housing sections passes through the center of opening 39 and, consequently, when the housing sections are assembled together, the bearing 48 is securely clamped therebetween. To insure that the bearing 48 is firmly held in position, an O-ring 50 is provided in an annular groove 51 which extends around the periphery of the bearing and also provides a seal for the grease. Sleeve bearing 47 rests on an upwardly extending projection 53 from lower housing section 26. Retaining the bearing 47 in its proper position is clamp 54 which is locked to projection 53 by means of screws 55. Integrally molded with the plastic lower section 26 are two projections 57 and 58 which support motor brushes 60 and 61, respectively. The brushes are retained in transverse grooves in projections 57 and 58 by means of plates 63 and 64 which are held to their respective projection by means of screws 65. The motor field assembly 43 is supported in motor chamber 31 by field assembly pins 67 resting on a plurality of lower housing section projections 69. At least two of the lower housing projections 69 have grooves to receive the field pins 67 so that the housing may be correctly positioned. Mounted on the armature shaft 45 is a centrifugal type fan 71 which is disposed in the fan chamber 33 between walls 35 and 38. Upon the rotation of armature shaft 45, the fan 71 causes air to be exhausted through outlet openings 73 which are defined in both the upper and lower housing sections 25 and 26.

In operation, rather severe thrust forces are imposed upon armature shaft 45 tending to force it towards the rear or handle portion 28 of the housing. Providing rigid support for the armature shaft 45 is a rectangularly shaped steel thrust pad 75 which is received in a vertically extending slot 77 in lower housing section 26 immediately behind the end of armature shaft 45. Near the bottom of vertical slot 77 is a shoulder 78 upon which the thrust pad 75 rests. The side of the slot 77 facing the armature 44 is essentially open. The opposite side of slot 77 has two parallel spaced grooves 79 extending upwardly immediately behind the thrust pad 75. An air inlet opening 80 is defined by the lower housing section 26 and extends to the bottom of slot 77. Therefore, upon the rotation of fan 71, air is drawn into inlet opening 80 and passes upwardly adjacent to both the front and rear sides of thrust pad 75. Moreover, the cooling air which enters through inlet 80 passes along the motor 42 and through opening 36 in wall 35 into fan chamber 33. Thus, with the construction, the considerable heat which is generated between the end of the rotatable armature shaft 45 and the stationary thrust pad 75 is dissipated by a constant flow of air coming through inlet opening 80. Supplemental air inlet openings (not shown) are formed in each side of the housing along the parting line between the upper housing section 25 and the lower housing section 26 near the clamp 54. Therefore, when the fan 71 is in operation, air is not only drawn through inlet opening 80 but also through supplemental air inlet openings allowing air to pass adjacent to and along the motor 42 for cooling purposes.

In accordance with the present invention, the upper housing section 25 is molded with a rectangular recess 83 for receiving a rectangularly shaped rubber block 85. On the opposite walls which form recess 83, there are provided inwardly projecting protuberances or fingers 86. It should be appreciated that the distance between the oppositely disposed protuberances 86 is smaller than the free length across the portion of rubber block 85 extending therebetween. Thus, when the resilient block 85 is placed in the recess 83, the protuberances 86 retain the block therein. In this manner, the rubber block 85 is easily inserted in recess 83 and retained therein during the assembly operation so that there is no problem of the rubber block falling away from the upper section. Moreover, with this construction, no additional parts are required to hold the block 85 to the upper housing section 25 because the protuberances 86 are integrally molded with the upper section. When the upper section 25 is assembled to the lower section 26, the resilient blocks 85 abuts against the field assembly 43 and, consequently, biases the field pins 67 into engagement with lower housing projections 69. Therefore, the block 85 provides an inexpensive means for holding the field assembly 43 in its proper operating position nd also compensates for an accumulation of assembly tolerances.

For the purpose of controlling the operation of motor 42, there is provided an electrical switch 88 having an upwardly extending actuating knob 89 which extends through an opening 90 in the upper housing section 25. The switch knob 89 is positioned so that it can be easily actuated by the user's hand which is gripping handle portion 28. The switch 88 is a standard type which may be inexpensively purchased. This switch has a horizontally extending mounting plate 92, a body 93 and two downwardly extending terminals 94. The upper housing section 25 has a rectangular recess 96 around opening 90 and the switch mounting plate 92 is received and positioned therein. The upper housing section opening 90 is sufficiently long to permit the knob 89 to actuate the switch. Disposed immediately below the switch 88 is a plastic member 99 having spaced upwardly extending arms 100 and 101. Each arm has a vertical portion 102 and 103 and a top portion 104 and 105 which angles upwardly and outwardly. As may be seen in FIG. 2, the switch body 93 is nested between the vertical arm portions 102 and 103 and the top portion of the arms 104 and 105 engage with the underside of switch mounting plate 92. The arms 100 and 101 are sufficiently thin so that they are relatively resilient and, consequently, bias the switch mounting plate 92 upwardly against the upper housing section 25 is recess 96. The member 99 has two bottom shoulders 106 and 107 and are positioned so that shoulder 106 engages with an upwardly extending projection 108 from the lower housing section 26 and shoulder 107 abuts against the top of thrust pad 75. Disposed between the shoulder 106 and 107 is a downwardly projecting tang 109 which is received in a lower housing section recess 110 adjacent to slot 77. With this construction, the member 99 is held in proper vertical position by shoulder 106 and 107 engaging with projection 108 and thrust pad 75 respectively. Moreover, the member 99 is restricted against lateral movement by the tang 109 engaging in recess 110. It should be appreciated that the shoulder 107 locks the thrust pad 75 in slot 77 so that it cannot come out during the operation of the motor. Furthermore, the member 99 locates the switch 88 with respect to the upper housing section opening 90 and biases the switch mounting plate 92 upwardly against the section within recess 96. Therefore, the member 99 performs the dual function of retaining and biasing switch 88 to its proper location and also maintaining thrust pad 75 in its operating position in slot 77. Inasmuch as the member 99 is fabricated from a dielectric plastic and is located between switch terminals 94, the lead wires secured to the terminals cannot be accidentally shorted.

For the purpose of converting the rotary motion of motor 42 to a reciprocating motion and for the purpose of transmitting power from the motor 42 to the cutter assembly 22, there is provided in gear chamber 32 a pinion gear 114 on armature shaft 45 adjacent to bearing 48 which gear is in operative engagement with a gear member 115 rotatably disposed on a post 116 depending from upper housing section 25. As may be easily seen in FIGS. 2 and 3. the stationary steel post 116 is rigidly mounted to the upper housing 25 in integral boss 118. The post 116 has a lower end 119 with a considerably reduced diameter. The gear member 115 includes a central bore 121 which receives the post 116 so that the gear member 115 may rotate thereon. The upper surface of the gear member 115 has gear teeth which are in engagement with the gear teeth on pinion gear 114. There is approximately a spaced reduction of 25.5:1 between gear 114 and 115. Inasmuch as only one gear set is being employed within the gear chamber 32 and teeth gear 114 and gear member 115 are angularly disposed with respect to armature shaft 45, there is considerable thrust imposed upon the armature shaft 45. In the present embodiment, the thrust imposed on the armature shaft under normal load is approximately seven pounds. Gear member 115 is formed with bore 123 which is parallel to and spaced from bore 121. Received within bore 123 is an eccentric 125 having a tubular portion 126 within bore 123 and a block portion 127 which is located below gear member 115. The block portion 127 has a rectangular configuration with longer side walls 128.

The bottom of gear chamber 32 is closed by cutter assembly 22 having a stationary comb 130 and a reciprocable cutter 131. Disposed beneath the cutter assembly 22 is a locking plate 132 which is held to the housing 21 by a plurality of screws. A gasket 134 is provided between the locking plate 132 and the lower housing section 26 in order to prevent the egression of grease from the gear chamber 32. As may be seen in FIG. 5, the cutter 131 has a transverse slot 136 which is intersected by a longitudinally extending slot 137. The eccentric block 127 is positioned within the cutter transverse slot 136 so that the longer walls 128 of the block engage with the sides of the transverse slot. It will be understood that the rotation of the gear member 115 causes the eccentric 125 to follow a circular path whereby the block portion 27 slides within the transverse slot 136 causing the cutter 131 to reciprocate in a longitudinal direction. In FIG. 5, the cutter and eccentric are illustrated in solid lines when the cutter is in the outward position and in broken lines to indicate the innermost position. The cutter has a downwardly bent tang 139 which is received in a comb slot 140 to assist in preventing the cutter from moving in a transverse direction. For the purpose of holding post 116 in its proper position, the comb 130 has a hole 142 which receives the post lower end 119. Thus, the post 116 is rigidly supported at both ends and, consequently, forms a rigid support for gear member 115. The lower post end 119 extends through the cutter longitudinal slot 137 so that the reciprocation of the cutter 130 does not interfere with the post.

The cutter assembly 22 extends outwardly from housing 21 and is in general alignment with both the housing hand gripping portion 128 and the motor armature 44. Both the comb 130 and the cutter 131 have a row of teeth 144 and 145, respectively, disposed on each side thereof. The comb teeth 144 have a plurality of notches formed along the transverse edges in order to retain twigs and branches therebetween while the cutter teeth 145 shear them. Maintaining the proper shearing tension between the comb 130 and the cutter 131, there is provided a pressure strip 147 which is disposed immediately above the cutter. The comb 130, cutter 131 and pressure strip 147 are held together by a plurality of screws 149 and nuts 150. A spring washer 151 is located immediately below the head of screw 149 to bias the pressure strip 147 toward the cutter which has elongated openings 152 through which the screws 149 pass.

The end of comb 130 remote from the housing 21 has an edge 153 which is perpendicular to the direction of cutter reciprocation. Near the end of cutter 131 are two spaced threaded studs 155 having enlarged heads 156 which are preferably spot welded to the cutter. The studs 155 lie approximately along the longitudinal center line of cutter 131 and, consequently, the studs lie in a plane parallel to the direction of reciprocation. A saw blade 160 having a row of saw teeth 161 and two spaced holes 162 for receiving the studs 155, as illustrated in FIGS. 9 and 10, may be securely locked to the end of cutter 131 by nuts 164 threadedly engaging the studs 155. In this manner, the saw blade 160 is locked to the cutter 131 so that the saw blade teeth 161 are in alignment with the direction of cutter reciprocation, the housing forward portion 29 and handle portion 28. Moreover, the saw blade teeth 161 are generally disposed between the double rows of cutter and comb teeth. In use, the hedge trimmer 20 can easily shear hedges on either side of the double rows of comb and cutter teeth and in addition, the saw blade is provided to cut heavy or old hedge branches. Inasmuch as the saw blade 160 is in alignment with the hand gripping portion 28 and reciprocates in a direction in alignment with hand-gripping portion, the saw blade is easily manipulated by the user to accurately sever branches.

Further assisting the user in accurately trimming hedges, there is provided a level gauge 170 on the top of housing 21 for visually indicating to the user when the cutter assembly 22 is horizontally disposed. The level gauge 170 is positioned in recess 171 on the top surface of upper housing section 25. Retaining the level gauge 170 in the recess 171 is an escutcheon 172 having an opening therein to receive a portion of the gauge therethrough. Thus, the escutcheon 172 holds the lower portion of the gauge within the housing recess 171. As seen in FIG. 2, the escutcheon 172 is also provided with an opening allowing the switch knob 89 to extend therethrough, and said escutcheon bears indicia adjacent switch knob 89 indicating its operating condition.

The looped handle 23 is fastened to the housing 21 by means of a plurality of screws. Thus, the hedge trimmer of the present invention may be used easily by either a right-handed or a left-handed person since one hand gripping portion is at the rear of the housing and the other gripping portion is the looped handle disposed over the center of the housing.

As disclosed hereinbefore, the electric hedge trimmer of the present invention provides a tool which can conveniently and accurately trim a hedge. Inasmuch as teeth are provided on both sides of the comb and cutter, the hedge trimmer cutter assembly 22 may cut in opposite directions. The saw blade positioned near the end of the cutter reciprocates in a direction in alignment with the hand gripping portion 28 and, consequently, may be easily used in accurately cutting branches which are beyond the shearing capacity of the comb and cutter teeth. The subject hedge trimmer employs a split housing construction fabricated from an inexpensive material such as plastic and the housing is constructed in such a manner as to support many components which are disposed therein. Moreover, the parts of the hedge trimmer are easily assembled together and many of these parts perform dual functions. This hedge trimmer employs a single set of gears to reduce the speed of the electric motor. The drive gear which is in driving relationship with the cutter is mounted for rotation on a post which is rigidly supported at both ends thereof. Due to the use of a single set of gears and the angle of the gear teeth, there is a considerable thrust on the armature shaft which is restrained by a steel thrust pad received in a housing slot. Since a considerable amount of heat is generated due to the friction between the end of the armature shaft and the thrust pad, adequate cooling is provided to prevent the thrust pad and housing from overheating. Furthermore, the thrust pad is held within the housing slot by a single member which also positions and biases the switch assembly in its proper location.

While there has been illustrated and described a particular embodiment of the present invention, it will be understood that changes and modifications may occur to those skilled in the art and it is, therefore, contemplated by the appended claims to cover all such changes and modifications as fall within the true spirit and scope of the present invention.

What is new and desired to be secured by Letters Patent of the United States is:

1. An electric hedge trimmer comprising a split housing having an upper and lower section, an electric motor mounted on said lower housing section, a cutter assembly secured to said lower housing section, said lower housing section defining a gear chamber above said cutter assembly, said motor being provided with a rotatable armature shaft which extends into said chamber, a first gear on said shaft in said chamber, said upper housing section closing said chamber and supporting a stationary post which extends into said chamber toward said cutter assembly, a second gear rotatably supported on said post and in driving engagement with said first gear, connecting means between said second gear and said cutter assembly whereby the rotation of said second gear causes said cutter assembly to reciprocate.

2. The electric hedge trimmer of claim 1 wherein said gear chamber is formed by said upper housing section, lower housing section and cutter assembly.

3. The electric hedge trimmer of claim 1 wherein said post is supported at one end by said cutter assembly.

4. The electric hedge trimmer of claim 3 wherein said connecting means includes an eccentric having a tubular portion which is rotatably received by said second gear at a point spaced from said post and a block portion which is slidably received in a cutter assembly slot extending transversely to the direction of reciprocation.

5. The electric hedge trimmer of claim 4 wherein said cutter assembly comprising a stationary comb which supports one end of said post and a reciprocable cutter which is provided with said transverse slot for receiving said block portion, said cutter including a longitudinal slot extending in the direction of reciprocation and which slot intersects with said transverse slot, said longitudinal slot providing clearance for said post to pass through said reciprocable cutter.

6. The hedge trimmer of claim 1 wherein said lower housing section is provided with recesses for receiving electric motor bearings and field assembly, means locking said bearings to said lower housing section, resilient means between said field assembly and upper housing section for biasing said field assembly toward said lower housing section whereby said motor field assembly is locked in position when said upper and lower sections are in assembled relationship.

7. In a hedge trimmer comprising a housing, a drive member mounted for rotation within said housing about a first axis, a cutter held by said housing for reciprocation and having a transversely extending slot, an eccentric having a tubular portion and a block portion, said eccentric tubular portion received by said member for rotation about a second axis which is parallel to and spaced from said first axis, said block portion received in said cutter transversely extending slot whereby the rotation of said member causes said cutter to reciprocate, a stationary comb disposed below said cutter and secured to said housing, a post secured at one end of said housing and having the other end supported by said comb, said cutter having a longitudinal slot which intersects said transverse slot in order to provide clearance for said post.

* * * * *

UNITED STATES PATENT OFFICE
CERTIFICATE OF CORRECTION

Patent No. 3,751,805      Dated August 14, 1973

Inventor(s) Robert D. Grahn

It is certified that error appears in the above-identified patent and that said Letters Patent are hereby corrected as shown below:

Column 1, line 23, "mployed" should be -- employed --. Column 4, line 16, "the" should be -- this --. Column 5, line 56, "spaced" should be -- speed --. Column 6, line 19, "27" should be -- 127 --.

Signed and sealed this 30th day of July 1974.

(SEAL)
Attest:

McCOY M. GIBSON, JR.           C. MARSHALL DANN
Attesting Officer              Commissioner of Patents